United States Patent Office 3,194,833
Patented July 13, 1965

3,194,833
REDUCTION OF PHENYLSULFAMIC ACID
AND PHENYLSULFAMATES
Morris Freifelder, Waukegan, Ill., and Bernard Meltsner, Toledo, Ohio, assignors to Abbott Laboratories, North Chicago, Ill., a corporation of Illinois
No Drawing. Filed Oct. 2, 1961, Ser. No. 141,988
6 Claims. (Cl. 260—500)

The present application is a continuation-in-part of previous application Serial No. 756,289 filed August 21, 1958, now abandoned.

This invention relates to a novel method for reducing phenylsulfamic acid and phenylsulfamates to the corresponding cyclohexyl derivatives, and to a method for preparing alkali cyclohexylsulfamates from ammonium phenylsulfamate.

Cyclohexylsulfamic acid and cyclohexylsulfamates are well-known compounds which stimulate the sense perception of sweetness. An example of such a cyclohexylsulfamate is sodium cyclohexylsulfamate known generically as sodium cyclamate. The general method in the prior art for preparing cyclohexylsulfamate provides reacting cyclohexylamine with sulfamic acid. Cyclohexylamine is an expensive reactant, and the amine salt prepared from the foregoing reactants involves several procedural steps prior to isolation.

It is highly desirable to employ aniline in place of cyclohexylamine as a starting reactant because of its low cost. The long-existing problem which prevents use of aniline as the starting reactant is the inability to reduce the resulting phenylsulfamic acid and phenylsulfamates to the cyclohexyl form. While phenylsulfamic acid and phenylsulfamates can be prepared by prior art methods, the reduction of said compounds to the cyclohexyl form has not been known. The existence of this problem is supported by the fact that related compounds such as sulfanilamide and sulfanilic acid cannot be hydrogenated to the corresponding cyclohexyl derivatives. It is also expected that any attempted reduction of phenylsulfamic acid would fail because it is known that said acid tends to rearrange to orthanilic acid and sulfanilic acid under acid conditions.

The prior art method which teaches reacting aniline with chlorosulfonic acid results in the aniline salt of phenylsulfamic acid or aniline phenylsulfamate together with aniline hydrochloride. The mixture of the double salt and aniline hydrochloride is removed by filtration and decomposed with an aqueous alkali hydroxide solution to form an alkali phenylsulfamate, free aniline and alkali chloride. Since the free aniline is not separated in the process, it must be removed by extraction with an organic solvent such as ether. The aqueous layer must be evaporated to dryness and the residue extracted with an alcohol to obtain the alkali phenylsulfamate free from alkali chloride for subsequent reduction to the desired alkali cyclamate. The same procedural objections apply when cyclohexylamine, rather than aniline, is reacted with chlorosulfonic acid.

It is an object of this invention to provide a method for reducing phenylsulfamic acid and phenylsulfamates.

Another object of this invention is to provide a reduction method which is simple and economical.

A still further object of this invention is to utilize a novel reduction step on the easily obtainable phenylsulfamic acid and its salts.

Another object is to provide a method for preparing alkali cyclohexylsulfamates from ammonium phenylsulfamate.

It is another object to provide a method for catalytic reduction of phenylsulfamic acid and phenylsulfamates wherein the catalysts can be reused without catalyst purification. Further objects will be apparent from the following specification, examples, and claims.

In accordance with the foregoing objects it has now been found that phenylsulfamic acid and phenylsulfamates can be reduced to the corresponding cyclohexyl derivatives in the presence of catalytic amounts of rhodium. The term "phenylsulfamates" is used to refer to salts of phenylsulfamic acid, and the term "cyclohexylsulfamates" refers to salts of cyclohexylfulfamic acid. Of special interest are the ammonium, alkali, and alkali-earth salts of said acids. The reduction is conducted with gaseous hydrogen at low pressure and room temperature to produce the ring-saturated cyclohexyl form in high yields, although higher temperatures and pressures may be employed to accelerate reduction.

In the process of manufacturing alkali metal and alkali-earth cyclamates such as sodium and calcium cyclamate, it is desirable to employ ammonium phenylsulfamate as a starting reactant. This particular reactant is obtained simply and directly by reacting aniline and sulfamic acid. The collected ammonium phenylsulfamate is reduced to ammonium cyclohexylsulfamate and an alkali metal hydroxide such as sodium hydroxide or alkali-earth metal hydroxide such as calcium hydroxide is added thereto to obtain the desired alkali cyclohexylsulfamate.

The process substantially provides the steps of admixing phenylsulfamic acid or its salts with catalytic amounts of a rhodium catalyst and hydrogenating said phenyl compound with gaseous hydrogen. Complete hydrogenation of the phenyl ring requires 3 moles of hydrogen. If phenylsulfamic acid is the starting material, the resulting cyclohexylsulfamic acid may be converted to the desired alkali metal or alkali-earth metal cyclohexylsulfamate. If a phenylsulfamate with a cation different from the desired salt is the starting material, that salt can subsequently be converted to the desired alkali metal or alkali earth salt as hereinafter described in the examples.

It is, therefore, further provided by this invention that any phenylsulfamate can be converted first to a phenylsulfamate with the desired cation and subsequently reduced to the desired cyclohexylsulfamate, or it can first be reduced to the corresponding cyclohexylsulfamate and then converted to the cyclohexylsulfamate with the desired cation, e.g., ammonium phenylsulfamate to sodium phenylsulfamate to sodium cyclohexylsulfamate, or ammonium phenylsulfamate to ammonium cyclohexylsulfamate to sodium cyclohexylsulfamate.

The following examples are presented to teach the invention in operation, but it should be understood that they are not an exclusive embodiment thereof.

EXAMPLE 1

*Sodium cyclohexylsulfamate*

Sodium phenylsulfamate, 3.2 g., is dissolved in 75 cc. of water. To this solution is added 1.5 g. of 5% rhodium on alumina. The mixture is hydrogenated in a Parr shaker under 30 p.s.i. pressure at room temperature. After one hour, the solution is filtered to remove catalyst and concentrated under reduced pressure to dryness. The dried solid product is treated with dry ether and filtered to obtain 3.2 g. (97.5% of theory) of sodium cyclohexylsulfamate. A sample of the obtained product is dissolved in water, is passed through an ion exchange resin column (acid form) and thereafter the solution is evaporated to dryness under reduced pressure. Free cyclohexylsulfamic acid is obtained, melting at 180° C. A sample of this acid mixed with a known sample of cyclohexylsulfamic acid shows no depression of the melting point, which confirms the identity of the obtained cyclohexylsulfamate and cyclohexylsulfamic acid.

A 3.0-g. sample of sodium phenylsulfamate is reduced in the above manner. The collected sodium cyclohexylsulfamate is passed through an ion exchange resin and the liberated acid is collected in a yield of 2.5 g. (91%). The cyclohexylsulfamic acid is recrystallized from absolute ethanol and dry ether.

The analytical values of 39.99% C, 7.50% H, and 7.83% N, correspond with the values calculated for $C_6H_{13}NO_3S$.

EXAMPLE 2

*Calcium cyclohexylsulfamate*

Ammonium phenylsulfamate, 2.725 g., is dissolved in 50 cc. of water. To this mixture is added 0.5306 g. of calcium hydroxide. To the resulting mixture is added 0.5 g. 5% rhodium on alumina, and the mixture is hydrogenated in a Parr shaker for about one hour at room temperature and about 30 p.s.i. of hydrogen pressure. The solution containing calcium cylohexylsulfamate is filtered to remove the catalyst, and then concentrated to dryness under reduced pressure. Calcium cyclohexylsulfamate is obtained in a yield of 2.5 g. (88%). The solution is then passed through an ion exchange resin as described in Example 1 to obtain cyclohexylsulfamic acid having a melting point of 180° C. The melting point is not depressed when the collected cyclohexylsulfamic acid is mixed with a known sample thereof.

EXAMPLE 3

*Ammonium cyclohexylsulfamate*

A 3.8-gram sample of ammonium phenylsulfamate is dissolved in 75 cc. of water. The solution is hydrogenated in a Parr shaker under 30 pounds pressure at room temperature in the presence of 1.0 g. 5% rhodium on alumina. Hydrogen uptake is completed after about one hour, and the solution is filtered to remove the catalyst. The solution is evaporated to dryness under reduced pressure to yield 3.0 g. of ammonium cyclohexylsulfamate. Cyclohexylsulfamic acid is obtained therefrom as in Example 1.

For reasons of simplicity, all the following examples are carried out with 23% aqueous ammonium phenylsulfamate solutions and 39% catalyst (based on the amount of ammonium phenylsulfamate) containing 5% rhodium on an alumina carrier, at a pressure of 12–28 p.s.i.g. hydrogen and at a temperature as indicated.

EXAMPLE 4

The above ammonium phenylsulfamate solution is first treated with 0.5 g. Darco G–60, a finely divided absorbing carbon marketed by the Atlas Power Company, and 0.5 g. of Hy-Flo, a filter aid marketed by Johns-Manville Product Corp. After shaking the solution with these pretreating agents, it is filtered and about 20 cc. of the solution is distilled to remove possible traces of aniline. The solution is placed in a Parr shaker and the catalyst is added. The air in the Parr shaker is replaced by hydrogen and 2 cc. of acetic acid is added. The hydrogenation is carried out at 50–50° C. within the above given pressure limits and continued for 84 minutes whereby 99.6% of the theoretical amount of hydrogen is taken up. The initial solution has of pH of 3.3 whereas the resulting solution has a pH of 4.4.

Since ammonium phenylsulfamate and the resulting cyclohexylsulfamate ammonium salt are both soluble in this slightly acidic aqueous medium, the rhodium catalyst can be easily removed by filtration. The filtered catalyst is reused for the reduction of a new batch of ammonium phenylsulfamate under identical conditions as in the first batch of this experiment and 99.4% of the theoretical amount of hydrogen is taken up within 119 minutes.

The catalyst is removed again by filtration and a third reduction is run under identical conditions, giving a 100% hydrogenation after 305 minutes. In a fourth repetition using the same catalyst, the hydrogenation is interrupted after 190 minutes, showing at 14.1% hydrogen uptake.

For comparison, an identical series of hydrogenations is run with the only difference that acetic acid is left out completely. In the first reduction, a 97% hydrogenation is observed after 94 minutes. In a second reduction, after 160 minutes, only 14.5% of the theoretical hydrogen uptake is measured. To assure that this result is not falsified by the presence of newly formed aniline, 20 cc. of the solution is distilled off and hydrogenation is continued for another 155 minutes, but no hydrogen uptake can be measured in this additional time period.

EXAMPLE 5

The procedure of Example 4 is repeated with the exceptions that no distillation (aniline) precedes the hydrogenation and the 2 cc. of acetic acid are replaced with 4 g. of cyclohexylsulfamic acid. In the first step of the reaction, a 100% hydrogenation is measured after 65 minutes. The initial reaction solution has a pH of 2.2, the resulting solution has a pH of 3.2. After filtration of the catalyst, and repetition of the first procedure with the filtered catalyst, a 100% hydrogen uptake is observed after 77 minutes. In a third reuse of the catalyst, a 100% hydrogen uptake is observed after 389 minutes with a terminal pH of 2.9.

EXAMPLE 6

In this example, the procedure of Example 4 is duplicated except that 4 g. of cyclohexylsulfamic acid replaces the 2 cc. of acetic acid. In the first hydrogenation, 100% hydrogen is taken up in 84 minutes. In a second hydrogenation with the same catalyst, 100% hydrogen uptake is observed after 96 minutes. In a third reuse of the catalyst, 100% hydrogen uptake is observed after 125 minutes; in a fourth attempt, 99.7% hydrogen is taken up after 185 minutes; in a fifth reduction, 99.7% hydrogen is taken up after 645 minutes; and a sixth reuse shows a hydrogen uptake of 41% after 200 minutes. The initial pH of the solution is between 1.75 and 1.95, the terminal pH is between 2.1 and 2.4.

EXAMPLE 7

The procedure of Example 6 is exactly duplicated, except that the maximum hydrogenation temperature is kept at 41° C. In the first run, a 100% hydrogen uptake is observed after 74 minutes; in the second run, 97.2% hydrogen is taken up in 175 minutes; in the third run, 100% hydrogen is taken up after 160 minutes; and in a fourth run with the same catalyst, a 99.6% hydrogen uptake is observed after 465 minutes. In these reductions, the initial pH varies between 1.9 and 2.2, the final pH is found to be between 2.5 and 2.9.

EXAMPLE 8

In a repetition of Example 6 the amount of cyclohexylsulfamic acid is varied. Using only 2 g. of this acid, the hydrogen uptake for the first three runs is found to be 100% at 84, 84, and 173 minutes respectively. The initial pH before the hydrogenation is 1.92 to 1.95; the terminal pH varies between 2.5 and 3.0.

Using 6 g. of cyclohexylsulfamic acid, 100% hydrogen uptake is found in the first four runs at 84, 78, 110 and 195 minutes, respectively. The pH changes during the hydrogenation from an initial valve of 1.56–1.66 to 1.9–2.1 at the end point.

EXAMPLE 9

Replacing cyclohexylsulfamic acid in the above examples at otherwise identical conditions with 2.2 g. sulfuric acid gives 100% hydrogenation in three runs at 110, 102, and 133 minutes.

When using hydrochloric acid in place of surfuric acid, similar results are obtained.

For another series of hydrogenations, 4.5 g. Amberlite

IRC50 (a weak acid ion exchange resin, marketed by Rohm & Haas) is pretreated with an aqueous acetic acid solution of sodium acetate of pH 2.36 and used with the catalyst as buffer in the manner described in Example 4. Theoretical hydrogenation is observed in the first three runs at 81, 92, and 260 minutes, respectively.

In the foregoing examples, phenylsulfamic acid and its salts were reduced to the corresponding cyclohexyl derivatives in the presence of catalytic amounts of rhodium at room temperature or slightly elevated temperatures. The time required for complete hydrogen uptake, although short may be shortened by increasing the temperature and/or pressure of the reduction process.

The rhodium catalyst referred to in the present description may be in the form of pellets, granules, or in its finely divided metallic form, or the rhodium may be supported by a carrier such as alumina, carbon kieselguhr, ziconium oxide, bentonite, asbestos, silica gel, etc. The rhodinum catalyst may be in pure form or it may be mixed with other batchwise hydrogenation reaction, while when operated at less acidic or even alkaline conditions, the catalyst needs regeneration after each batch. The fact that the catalyst The invention discloses the operability of the specific catalyst, rhodium, for reducing phenylsulfamic acid and phenylsulfamates. It is apparent that variations in temperature, pressure, catalyst ratio and physical equipment comprise a portion of the disclosed process. By employing the specific catalyst in the manner disclosed, standard steps in the hydrogenation art may be modified to still obtain the cyclohexylsulfamic acid and cyclohexylsulfamates. The aforementioned variations may reside in the choice of catalyst, carrier, ratio of catalyst to un-reduced reactant, temperature, pressure and mechanical apparatus.

One particular advantage is the use of the above rhodium catalyst for the hydrogenation process at a pH of less than 5. Under these conditions, the rhodium catalyst is found to be reusable several times for the same batchwise hydrogenation reaction, while when operated at less acidic or even alkaline conditions, the catalyst needs regeneration after each batch. The fact that the catalyst is reusable under acidic conditions is quite surprising, considering that the catalyst used under neutral or alkaline conditions cannot be reactivated by an acid treament. Among the preferred acids to bring the pH below 5 are acetic acid, oxalic acid, cyclohexylsulfamic acid, benzoic acid, sulfuric acid, hydrochloric acid, or acidic salts that will produce a pH below 5, e.g., solid acetate or any other organic or inorganic materials that are inert, i.e., that do not react with any of the materials present in the reaction vessel.

It will be apparent that the disclosed method is well adaptable to a continuous process whereby the rhodium catalyst in the form of pellets or in a fixed bed is added to an aqueous or alcoholic solution of phenylsulfamate or phenylsulfamic acid in the presence of a weak acid or an acidic salt. Such a solution is continuously passed over the aforementioned catalyst in the presence of a concurrent or countercurrent stream of hydrogen.

Others may practice the invention in any of the numerous ways which will be suggested by this disclosure to one skilled in the art. All such practice of the invention is considered to be a part thereof provided it falls within the scope of the appended claims.

What we claim is:
1. In the method of preparing cyclohexylsulfamic acid, the step comprising hydrogenating phenylsulfamic acid in the presence of a catalytic amount of rhodium.
2. In the method of preparing cyclohexylsulfamate, the step comprising hydrogenating phenylsulfamate in the presence of a catalytic amount of rhodium until 3 moles of hydrogen are absorbed per mole of phenylsulfamate.
3. The method of claim 2 wherein said phenylsulfamate is ammonium phenylsulfamate.
4. The method of claim 2 wherein said phenylsulfamate is sodium phenylsulfamate.
5. The method of claim 2 wherein said phenylsulfamate is calcium phenylsulfamate.
6. In the method of preparing alkali cyclohexylsulfamates, the steps comprising hydrogenating ammonium phenylsulfamate in the presence of a catalytic amount of rhodium and adding a stoichiometric amount of a compound selected from the group consisting of alkali hydroxide and alkali-earth hydroxide.

References Cited by the Examiner

UNITED STATES PATENTS

| | | | |
|---|---|---|---|
| 2,184,070 | 12/39 | Bertsch | 260—563 |
| 2,675,390 | 4/54 | Rosenblat | 260—631 |
| 2,776,276 | 1/57 | Glasebrook et al. | 260—638 |
| 3,082,247 | 3/63 | Freifelder | 260—500 |

FOREIGN PATENTS 1,241,633  8/60  France.

OTHER REFERENCES

Ellis, "Hydrogenation of Organic Substances," 3rd Edition, pp. 87–188 (1930).

Fuson et al., "Organic Chemistry," 2nd Edition, p. 488 (1954).

LEON ZITVER, *Primary Examiner.*

UNITED STATES PATENT OFFICE
CERTIFICATE OF CORRECTION

Patent No. 3,194,833                                        July 13, 1965

Morris Freifelder et al.

It is hereby certified that error appears in the above numbered patent requiring correction and that the said Letters Patent should read as corrected below.

Column 2, line 10, for "cyclohexylfulfamic" read -- cyclohexylsulfamic --; column 3, line 54, for "Atlas Power Company" read -- Atlas Powder Company --; line 62, for "50-50° C." read -- 50-55° C. --; line 65, for "of", first occurrence, read -- a --; column 4, line 3, for "at" read -- a --; line 65, for "valve" read -- value --; column 5, lines 20 to 22, strike out "batchwise hydrogenation reaction, while when operated at less acidic or even alkaline conditions, the catalyst needs regeneration after each batch. The fact that the catalyst" and insert instead -- noble metals, but at least 50% of the active catalyst metal is rhodium for the catalyst to be considered a rhodium catalyst. --.

Signed and sealed this 10th day of May 1966.

(SEAL)
Attest:

ERNEST W. SWIDER
Attesting Officer

EDWARD J. BRENNER
                                                     Commissioner of Patents